US009424587B2

(12) United States Patent
Chen

(10) Patent No.: US 9,424,587 B2
(45) Date of Patent: Aug. 23, 2016

(54) ADVERTISEMENT SUPPORTED VIDEO DOWNLOAD

(75) Inventor: Michael A. Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1347 days.

(21) Appl. No.: 11/733,876

(22) Filed: Apr. 11, 2007

(65) Prior Publication Data

US 2008/0256572 A1    Oct. 16, 2008

(51) Int. Cl.
| | | |
|---|---|---|
| H04N 7/10 | (2006.01) | |
| H04N 7/025 | (2006.01) | |
| G06Q 30/02 | (2012.01) | |
| H04N 19/51 | (2014.01) | |
| H04N 19/59 | (2014.01) | |
| H04N 21/485 | (2011.01) | |
| H04N 13/00 | (2006.01) | |
| H04N 19/57 | (2014.01) | |
| H04N 21/234 | (2011.01) | |
| H04N 21/2547 | (2011.01) | |
| H04N 21/488 | (2011.01) | |
| H04N 21/81 | (2011.01) | |
| H04N 5/262 | (2006.01) | |

(52) U.S. Cl.
CPC ...... *G06Q 30/0251* (2013.01); *H04N 7/26856* (2013.01); *H04N 7/465* (2013.01); *H04N 13/0029* (2013.01); *H04N 19/00678* (2013.01); *H04N 19/00757* (2013.01); *H04N 21/23424* (2013.01); *H04N 21/2547* (2013.01); *H04N 21/4858* (2013.01); *H04N 21/4886* (2013.01); *H04N 21/812* (2013.01); *H04N 5/2628* (2013.01); *H04N 2201/325* (2013.01); *H04N 2201/3226* (2013.01)

(58) Field of Classification Search
USPC .......................................................... 725/32
See application file for complete search history.

(56) References Cited

U.S. PATENT DOCUMENTS

| | | | | |
|---|---|---|---|---|
| 6,304,715 B1 * | 10/2001 | Abecassis | ............... | G11B 7/14 |
| | | | | 348/E5.102 |
| 6,415,437 B1 * | 7/2002 | Ludvig et al. | .................. | 725/41 |
| 6,799,327 B1 * | 9/2004 | Reynolds et al. | ............... | 725/42 |
| 7,000,242 B1 * | 2/2006 | Haber | ............................. | 725/43 |
| 7,665,105 B2 * | 2/2010 | Evans | ............................. | 725/32 |
| 7,673,017 B2 * | 3/2010 | Kim et al. | .................... | 709/218 |
| 7,720,351 B2 * | 5/2010 | Levitan | .................... | H04N 5/76 |
| | | | | 386/250 |
| 7,757,252 B1 * | 7/2010 | Agasse | ........................... | 725/41 |
| 7,860,742 B1 * | 12/2010 | Gonzalez-Rivas | ........... | 705/14.4 |
| 7,865,306 B2 * | 1/2011 | Mays | ............................ | 701/437 |
| 7,873,261 B2 * | 1/2011 | Tischer | .................. | H04N 5/783 |
| | | | | 386/343 |
| 7,979,877 B2 * | 7/2011 | Huber et al. | .................... | 725/36 |
| 8,849,100 B2 * | 9/2014 | Haberman | ............ | H04N 7/165 |
| | | | | 386/249 |
| 9,066,131 B1 * | 6/2015 | Arsenault | ........... | H04N 21/432 |
| 2002/0042920 A1 * | 4/2002 | Thomas et al. | ................... | 725/87 |
| 2002/0046401 A1 * | 4/2002 | Miyazaki et al. | .............. | 725/32 |
| 2002/0092019 A1 * | 7/2002 | Marcus | ..................... | 725/37 |
| 2002/0120939 A1 * | 8/2002 | Wall et al. | ...................... | 725/87 |
| 2002/0126142 A1 * | 9/2002 | Hodgkinson | ................ | 345/719 |
| 2002/0184047 A1 * | 12/2002 | Plotnick et al. | .................. | 705/1 |
| 2003/0123744 A1 * | 7/2003 | Chui et al. | .................... | 382/240 |

(Continued)

Primary Examiner — Jonathan V Lewis
(74) Attorney, Agent, or Firm — Banner & Witcoff, Ltd.

(57) ABSTRACT

System and method for facilitating advertisements within viewed content. The advertisements may be banner advertisements or other advertisement. The advertisements may be included in such a manner that if a user skips or otherwise fast forwards through the advertisements, the user if force to skip through at least a portion of the viewed content.

21 Claims, 1 Drawing Sheet

(56) References Cited

U.S. PATENT DOCUMENTS

| | | | |
|---|---|---|---|
| 2003/0192060 A1* | 10/2003 | Levy | 725/133 |
| 2003/0196206 A1* | 10/2003 | Shusman | 725/91 |
| 2003/0229900 A1* | 12/2003 | Reisman | 725/87 |
| 2003/0233656 A1* | 12/2003 | Sie et al. | 725/46 |
| 2004/0034874 A1* | 2/2004 | Hord et al. | 725/136 |
| 2004/0158858 A1* | 8/2004 | Paxton et al. | 725/42 |
| 2004/0210931 A1* | 10/2004 | Gordon et al. | 725/39 |
| 2006/0277569 A1* | 12/2006 | Smith | G11B 27/036 725/35 |
| 2007/0169157 A1* | 7/2007 | Abernethy et al. | 725/89 |
| 2007/0283381 A1* | 12/2007 | Sidi et al. | 725/32 |
| 2008/0155585 A1* | 6/2008 | Craner et al. | 725/32 |
| 2008/0163289 A1* | 7/2008 | Keys | 725/32 |
| 2009/0228936 A1* | 9/2009 | Davis et al. | 725/80 |
| 2010/0054715 A1* | 3/2010 | Marriott et al. | 386/124 |
| 2012/0233631 A1* | 9/2012 | Geshwind | 725/1 |

\* cited by examiner

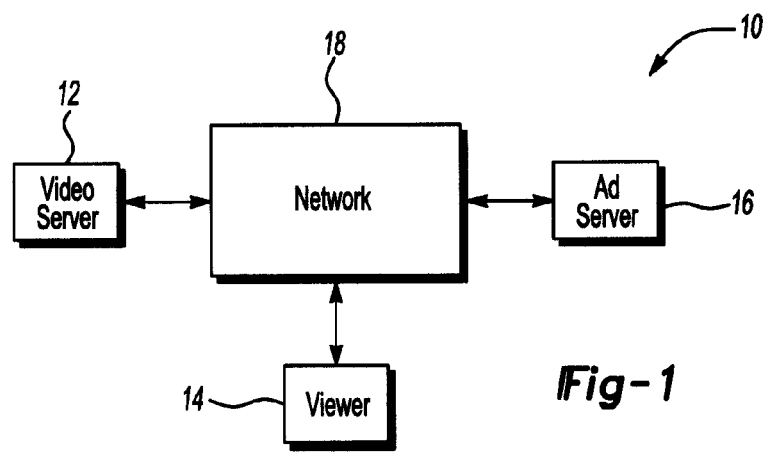
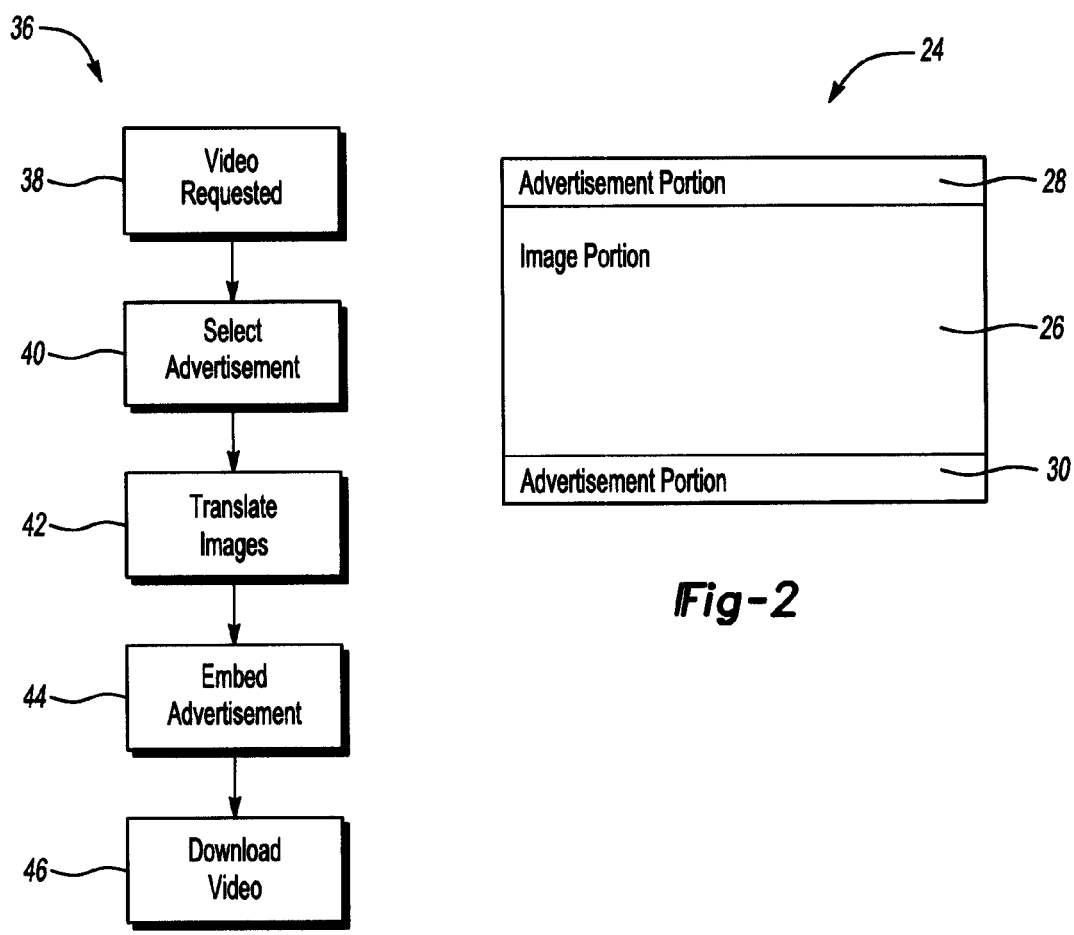

ADVERTISEMENT SUPPORTED VIDEO DOWNLOAD

BACKGROUND OF THE INVENTION

1. Field of the Invention

The present invention relates to advertisement supported video downloading of the type wherein advertisements are included with downloaded video.

2. Background Art

Videos generally comprises a number images embodied in a number of full-frame video frames. The video frames may be displayed over time to view the mages included on the various video frames. With respect to broadcast television, for example, advertisements may be included within the video, such as but not limited to supporting costs and other expenses associated with broadcasting the video.

The advertisements may be full-frame advertisements in that they occupy full video frames in a similar manner as the images associated with the watched content. When a viewer watches the video, the images are not shown while the advertisement are being shown due to the corresponding images being full-frame images occupying the entire viewing area.

A portion of the content/image related frames may be interrupted with a number of advertisement frames in a process generally referred to as advertisement splicing. The splicing generally corresponds with the advertisement related video frames being inserted between successive image or non-advertisement frames such that the advertisement frames must be viewed before returning to viewing of the images frames.

One problem with this approach, which is particularly detrimental to the advertisers paying for the corresponding advertisements, occurs when viewers watch the video in a non-real time or non-broadcast manner, such as but not limited to viewing from a video recorder, PC, etc., and fast forwards past, skips, or otherwise limits viewing of the advertisement frames.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawing in which:

FIG. 1 illustrates a system for advertisement supported video delivery in accordance with one non-limiting aspect of the present invention;

FIG. 2 illustrates a video frame in accordance with one non-limiting aspect of the present invention; and FIG. 3 illustrates a flowchart of a method of advertisement supported video download in accordance with one non-limiting aspect of the present invention.

DETAILED DESCRIPTION OF THE PREFERRED EMBODIMENT(S)

FIG. 1 illustrates a system 10 for advertisement supported video delivery in accordance with one non-limiting aspect of the present invention. The system 10 may generally correspond with downloading, or otherwise communicating, a video, or other content file, from a video server 12 to a viewer 14 for viewing. The viewer may be a television, computer, digital video recorder, mobile device, and/or other entity configured to support playback of the video.

The system 10 may further include an advertisement server 16 to provide advertisements for inclusion within the video. The advertisement server 16, video server 12, and viewer 14 may be connected to each other or otherwise in communication by way of a network 18. The network 18 may comprise any wireline and/or wireless network sufficient to support electronic communications between the same. The videos and advertisements may be communicated over the network 18 to provide advertisement support video delivery in accordance with one non-limiting aspect of the present invention.

The present invention, as noted below, is predominately described with respect to downloading a video file or other length of video to a computer or mobile device for subsequent playback. The video may be download to any device suitable to facilitate video playback, such as but not limited to those devices having capabilities to support fast forward and other video related playback controls. While the present invention is described in this manner, it is not intended to be so limited and fully contemplates its application to other environments and supporting advertising in any type of video viewing, including but not limited cable television on-demand and broadcast (real-time) related viewing.

The types of devices having capabilities to support fast forward and other related video controls provide problems with respect to requiring or otherwise forcing advertisement viewing, as the operators thereof may elect to fast forward or otherwise skip the advertisement. One non-limiting aspect of the present invention is intended to limit this problem by requiring any fast forwarding or skipping of the advertisement to correspond with fast forwarding or skipping a corresponding portion of the video, i.e., the content desired for viewing, on the belief that viewers will be less likely to fast forward or otherwise skip the advertisement if the corresponding content must also be fast forwarded or otherwise skipped.

The video may comprise or otherwise be made up on a number of images included on a number of video frames. The corresponding image frames may be played in succession by the viewer 14 or other device to facilitate viewing of the corresponding images/content. The video frames may be associated with analog or digital communication methodologies and transferred according to any number of protocols and standards associated with the same. The video delivered to the viewer 14 may be received from a video source remotely located from the video and it may include full-frame images designed to provide full screen viewing for standard (4×3), widescreen (16×9), or other viewing screens.

The advertisement server 16 may include any number and type of advertisements for inclusion within the video. The advertisements may be full-frame and/or limited frame video and/or non-video advertisements. Optionally, the advertisements may be banner advertisement, such as the type commonly known to appear on websites or webpages, such as the type that appear across a portion of a webpage. The banner advertisement may include an image, video, or other animation, as well as a link to a webpage or other resource associated with an advertiser.

Banner advertisements are commonly employed on websites to facilitate generation of advertisement revenue. When a user views the website, the banner advertisements appear to convey a message, image, or other feature, and optionally a link or other means for directing the viewer to a website associated with the advertisers. Advertisements servers, such as the one shown in FIG. 1, may be employed to support selection and delivery of such banner advertisements.

Advertisers desiring to pay for or otherwise purchase advertisements may upload a picture and URL address to the server. The server 16 may format the picture (or other image) and process the URL to provide a banner advertisement of desired size, shape, appearance, etc. The advertiser may be required to pay varying amounts for these features as well as the for each showing of the advertisement. One non-limiting aspect of the present invention contemplates including such banner advertisements within downloaded video and charging the corresponding advertisers for each showing of the banner advertisements so as to support advertisement based video download.

The video server 12 may be configured to receive a particular video for downloading to the viewer 14. The request may include information on the viewer 14 and/or otherwise be associated with the same. This information may then be provided to the advertisement server 16 to facilitate selecting one or more advertisements for inclusion within the video. The advertisers and/or advertisement server 16 may specify any number of conditions and/or algorithms to support selecting the advertisements. The selected advertisements may be sent to the video server 12 and included within the video download.

The video server 12 may be configured to embed the advertisements within the video such that the viewer is unable to fast forward or otherwise skip the advertisement without fast forwarding or otherwise skipping at least a portion of the video. This may include embedding the advertisements within the image frames comprising the video such that the corresponding video frames include images and advertisements on the same frame such that if the user skips the frame, the corresponding image must also be skipped.

The advertisement may be included and/or otherwise embedded within the video frames according to any suitable methodology, which may depend on the type of advertisement, i.e., whether the advertisement is a banner advertisement or a video advertisement. Any suitable tracking system may used to track advertisement inclusion and whether the included advertisement were actually accessed by the viewer 14, i.e., whether the user clicked on the advertisement.

The embedding of the advertisements may optionally include translating the images to occupy a smaller portion of the video frames. Full-frame images, for example, may be sized to take up the entire viewing area of the screen or other device used to view the video. The present invention, however, contemplates reducing the image size, such as through a translation process, so that the corresponding image occupies a smaller portion, something less than full-frame. This creates a gap/available area for inclusion within the video frame, which the present invention contemplates for receipt of the advertisement.

The gap produced from translating the images may correspond with a pillar box and/or letter box. The pillar box may correspond with a portion of a standard viewing area (4×3) and the letter box may correspond with a portion of a widescreen viewing area (16×9). The boxes may be arranged on the top, bottom, or side of the images to provide space for the advertisements. Another methodology to create room for the advertisement may include converting standard full-frame images to widescreen images, the widescreen images being wider and shorter than the standard images, thereby creating a suitable gap above and below the image.

The size of the gap may also be suited or adjusted to the size of the selected advertisement. Optionally, rather than relaying on gaps, the advertisement may be overlaid used to block out or cover a portion of the image. Once the positioning, sizing, and other aspect related to advertisement are determined, optionally by the video server 12, the advertisement may be embedded into the corresponding video frame such that the video frame now includes and image portion and an advertisement portion.

FIG. 2 illustrates a video frame 24 having image 26 and advertisement portions 28-30 in accordance with one non-limiting aspect of the present invention. The illustration generally corresponds with advertisement portions 28-30 being provided relative to a top and bottom side of the image portion 26. The advertisement portions 28-30, however, may be located at any position relative to the image portion 26, and optionally, depending to the translation of the image. Furthermore, if the multiple advertisement portions are included, different advertisements may be included in each portion. The advertisements may changed over time, and during playback of the same video.

If the viewing device includes other processing and communication capabilities, the advertisements may be clicked on or otherwise selected to access more information with respect to the associated advertisement, such as by being transported to website of the advertiser if such an address is included within or otherwise associated with the advertisement. Optionally, if the advertisements are banner advertisements, i.e., internet based advertisements having images and URLs, such advertisements may still be included even if the viewer is unable to access the corresponding website, such as to facilitate displaying a logo of the advertiser.

FIG. 3 illustrates a flowchart 36 of a method of advertisement supported video download in accordance with one non-limiting aspect of the present invention. The method broadly relates to including advertisements within video. The method is describe with respect to a file download or other process wherein a user obtains a full copy of the video for playback when not connected or in communication with a video server from which the video may be downloaded. This is done for exemplary purposes only and the present invention fully contemplates its application to any process for providing video.

Block 38 relates to receipt of a video request. The video request may be made from a viewer to an video server and specify a video or other content desired for downloading. User information, device information, and other information may be determined from the request to identify the video, the capabilities of the device intended to playback the video, interests/habits of the user, etc. This information may be communicated to an advertisement server and/or used by the video server in facilitating the video download.

Block 40 relates to selecting an advertisement for inclusion with the video download. The selected advertisement may be determined by the video or advertisement server. It may be selected to correspond with the user's viewing habits and/or capabilities of the device intended to playback the downloaded video. Optionally, advertisers may specify how their advertisements may be selected and the advertisers may be billed upon the selection thereof.

Block 42 relates to optionally translating images associated with the video to make room or gaps of the selected advertisements. One or more images associated with one or more frames may be translated in this manner. Some video frames may include different sized image translation relative to other video frames depending on the size and shape of the advertisement intended for the same, such as if different advertisements are selected for showing at different times and/or within the same video frame.

Block 44 relates to embedding the advertisement in at least a portion of a number of video frames making up the requested video. The video frames may be adapted to include images associated with the requested video and the selected advertisement such that at least a portion of the video frames include banner advertisements and images. This may be helpful in preventing fast forwarding past the banner advertisements without similarly fast forwarding past a corresponding portion of the images Block 46 relates to downloading the requested video, including the embedded advertisements, to the viewer. The video may be downloaded in any suitable manner. Once downloaded, the video providing entity and advertisers may gain a mutual benefit in requiring playback of the video to automatically include viewing of the embedded advertisements, unless of course the advertising portion of the video is fast forwarded or otherwise skipped, which may be unlikely considering such action will fast forward past or skip a corresponding portion of the video do to the images being on some of the same frames as the advertisements.

As described above, one non-limiting aspect of the present invention may relate to collecting online banner ad images and injecting/encoding them into video content such that the banner ad images are present while the video content is being played back. This allows an advertising-supported model for offering video content, such as but not limited for use with portable media devices, video on demand (VOD), online streaming, etc.

The online banner ads may be collected e.g. from a URL, and a script may be constructed to govern their injection/encoding into video content using image composition techniques e.g. scaling and translation. One embodiment may select the banner ads to associate with a piece of video content based on some correlation/correspondence between known, deduced or derived properties of the video content and known, deduced or derived properties of the selected advertisements. E.g., if the video content is discovered to be basketball, the advertising can steer toward NBA, WNBA, basketball apparel and/or footwear, related professional sports, etc.

One non-limiting aspect of the present invention relates to providing methods for advertising support for a free video download content model to portable devices. This technique may inhibit separation of advertising from main content in by compositing the ads and the content in the same video frame. Since the online banner ads can be tracked via the download URL, and the portable media content can be tracked via content file download, an ad-sponsored free content business model is facilitated.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    receiving, by a computing device, a download request comprising an identification of video content, wherein the video content comprises a plurality of video frames each having a first aspect ratio;
    determining a spatial dimension of an advertisement selected for inclusion with the video content;
    generating, by the computing device, a plurality of resized video frames, each having a second aspect ratio different from the first aspect ratio, by reducing a spatial dimension of the plurality of video frames by at least the spatial dimension of the advertisement; and
    generating, by the computing device, a second plurality of video frames each having the first aspect ratio by compositing the plurality of resized frames with the advertisement in a non-overlapping manner.

2. The method of claim 1, further comprising selecting the advertisement from an advertisement server storing a plurality of advertisements associated with advertising entities.

3. The method of claim 2, further comprising determining an amount to bill the advertising entities based on usage of the plurality of advertisements associated with the advertising entities.

4. The method of claim 1, further comprising:
    receiving, by the computing device, the advertisement from an advertisement server based on information sent to the advertisement server; and
    communicating, by the computing device, the second plurality of video frames to a source of the download request.

5. The method of claim 1, wherein the reducing a spatial dimension, by the computing device, of the plurality of video frames comprises creating a first gap on a first side of the plurality of video frames, sized based at least in part on the spatial dimension of the advertisement, and creating an additional gap on a second side of the plurality of video frames opposite the first side, sized based at least in part on a spatial dimension of a second advertisement.

6. The method of claim 1, wherein the spatial dimension of the advertisement corresponds to a width of a pillar box or a height of a letter box.

7. A method comprising:
    receiving, by a computing device, a request indicating video content;
    selecting an advertisement for inclusion within the video content;
    resizing, by the computing device, frames of the video content to produce one or more resized frames and a gap contiguous with the video content;
    generating video content comprising the one or more resized frames and the advertisement for concurrent display; and
    in response to receiving a request to fast forward a portion of the generated video content comprising the advertisement, simultaneously removing from the generated video content an omitted number of frames of the advertisement and at least the omitted number of frames of the resized frames.

8. The method of claim 7, wherein the generating video content comprising the one or more resized frames and the advertisement for concurrent display comprises compositing each of the one or more frames of the advertisement within the gap.

9. The method of claim 8, wherein the gap is dimensioned according to a dimension of the advertisement.

10. The method of claim 9, wherein a dimension of the gap corresponds to a width of a pillar box or a height of a letter box.

11. The method of claim 7, wherein an image of each of one or more frames of the advertisement is generated within the gap to interrupt a portion of the video content occurring after a beginning and before an end of the video content.

12. The method of claim 7, wherein the selecting the advertisement further comprises receiving the advertisement from an advertisement server based on information sent to the advertisement server.

13. The method of claim 12, further comprising determining a total cost to bill an advertising entity associated with the advertisement upon a downloading of the advertisement.

14. The method of claim 7, wherein the advertisement comprises a web page link suitable for use in accessing a web page of an advertising entity associated with the advertisement.

15. The method of claim 7, further comprising limiting a dimension of the advertisement to correspond with only a limited portion of a viewing area used to show the video content.

16. A system comprising:
   a computing device configured to communicate with an advertisement server, the computing device configured to:
      receive a request indicating video content requested for download and having a first aspect ratio;
      receive, from the advertisement server, an advertisement selected for inclusion in the video content;
      generate a plurality of resized video frames, each having a second aspect ratio different from the first aspect ratio, by reducing a spatial dimension of the video content by at least a spatial dimension of the advertisement; and
      generate a second plurality of video frames having the first aspect ratio by compositing the plurality of resized video frames with the advertisement in a non-overlapping manner.

17. The system of claim 16, wherein the advertisement is a banner advertisement.

18. The system of claim 17, wherein a dimension of the banner advertisement corresponds to a gap in each of the plurality of resized video frames after the resizing.

19. A method comprising:
   transmitting, to a computing device, a request to download video content, wherein the video content comprises a plurality of video frames having a first aspect ratio;
   selecting an advertisement based at least in part on viewing habits associated with a user;
   generating a plurality of resized video frames, each having a second aspect ratio different from the first aspect ratio, by reducing a spatial dimension of the plurality of video frames by at least a spatial dimension of the advertisement; and
   generating a second plurality of video frames, each having the first aspect ratio, by compositing the plurality of resized video frames with the advertisement in a non-overlapping manner.

20. The method of claim 19 further comprising:
   in response to receiving a command to fast forward a portion of the second plurality of video frames, simultaneously removing from the second plurality of video frames an omitted number of frames comprising the advertisement and at least the omitted number of frames from the plurality of resized video frames.

21. The method of claim 19 further comprising:
   in response to the selecting the advertisement, receiving the advertisement from an advertisement server.

* * * * *